United States Patent
Hatada et al.

(10) Patent No.: US 11,413,704 B2
(45) Date of Patent: Aug. 16, 2022

(54) ADJUSTMENT ASSISTANCE DEVICE AND LASER WELDING APPARATUS

(71) Applicant: FANUC CORPORATION, Yamanashi (JP)

(72) Inventors: Masanobu Hatada, Yamanashi (JP); Tomoyuki Yamamoto, Yamanashi (JP); Shigeo Yoshida, Yamanashi (JP); Takahiro Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 123 days.

(21) Appl. No.: 16/921,054

(22) Filed: Jul. 6, 2020

(65) Prior Publication Data
US 2021/0016389 A1 Jan. 21, 2021

(30) Foreign Application Priority Data
Jul. 17, 2019 (JP) .............................. JP2019-131893

(51) Int. Cl.
*B23K 26/03* (2006.01)
*B23K 26/082* (2014.01)
*B23K 26/21* (2014.01)

(52) U.S. Cl.
CPC .......... *B23K 26/032* (2013.01); *B23K 26/082* (2015.10); *B23K 26/21* (2015.10)

(58) Field of Classification Search
CPC .... B23K 26/032; B23K 26/082; B23K 26/06; B23K 26/066; B23K 26/21
USPC ............ 219/121.67, 121.73, 121.74, 121.78, 219/121.79, 121.83, 121.6, 121.61
See application file for complete search history.

(56) References Cited

U.S. PATENT DOCUMENTS

| | | | | |
|---|---|---|---|---|
| 3,182,574 A | * | 5/1965 | Fleisher | G02F 1/29 396/561 |
| 3,549,733 A | * | 12/1970 | Caddell | G03F 7/039 264/400 |
| 3,657,510 A | * | 4/1972 | Rothrock | H01S 3/11 219/121.11 |
| 4,032,861 A | * | 6/1977 | Rothrock | H01S 3/08 372/103 |

(Continued)

FOREIGN PATENT DOCUMENTS

JP 2010-207878 A 9/2010

*Primary Examiner* — Jimmy Chou
(74) *Attorney, Agent, or Firm* — Studebaker & Brackett PC (57) ABSTRACT

An adjustment assistance device is attached to a galvanometer scanner at a laser output side of the galvanometer scanner and used to adjust a tool coordinate system of the galvanometer scanner. The adjustment assistance device includes a light-receiving member having a light-receiving surface, which is at least one flat surface; and a connecting member that connects the light-receiving member to the galvanometer scanner and that enables the light-receiving surface to face a laser output port of the galvanometer scanner with a predetermined distance therebetween. The light-receiving member includes a light-receiving mark portion on the light-receiving surface, the light-receiving mark portion being a mark used to quantify a relative positional difference between a reference light-receiving position for light output from the laser output port and an actual light-receiving position at which the light output from the laser output port is received.

6 Claims, 5 Drawing Sheets

(56) References Cited

U.S. PATENT DOCUMENTS

| | | | | |
|---|---|---|---|---|
| 4,156,124 A * | 5/1979 | Macken | B23K 26/066 | 219/121.68 |
| 4,918,284 A * | 4/1990 | Weisz | B23K 26/351 | 219/121.69 |
| 5,010,230 A * | 4/1991 | Uemura | B23K 26/032 | 219/121.62 |
| 5,055,653 A * | 10/1991 | Funami | B23K 26/0665 | 219/121.75 |
| 5,198,843 A * | 3/1993 | Ito | G06K 1/126 | 347/256 |
| 5,296,673 A * | 3/1994 | Smith | B41M 5/24 | 219/121.68 |
| 5,329,090 A * | 7/1994 | Woelki | B23K 26/08 | 219/121.68 |
| 5,521,628 A * | 5/1996 | Montgomery | B41J 2/471 | 347/243 |
| 5,670,068 A * | 9/1997 | Kuriyama | B23K 26/0665 | 219/121.68 |
| 5,670,069 A * | 9/1997 | Nakai | B23K 26/066 | 219/121.64 |
| 5,703,709 A * | 12/1997 | Mori | B23K 26/0648 | 359/196.1 |
| 5,837,962 A * | 11/1998 | Overbeck | B23K 26/0665 | 219/121.68 |
| 5,998,759 A * | 12/1999 | Smart | B23K 26/0853 | 219/121.69 |
| 6,008,914 A * | 12/1999 | Sasagawa | B23K 26/0604 | 359/15 |
| 6,040,552 A * | 3/2000 | Jain | B23K 26/067 | 219/121.7 |
| 6,072,631 A * | 6/2000 | Guenther | G02B 5/32 | 359/565 |
| 6,130,009 A * | 10/2000 | Smith | B41J 2/162 | 219/121.7 |
| 6,160,603 A * | 12/2000 | Tanaka | B23K 26/066 | 349/143 |
| 6,172,328 B1 * | 1/2001 | Jones | A24C 1/42 | 219/121.68 |
| 6,452,132 B1 * | 9/2002 | Fuse | B23K 26/066 | 219/121.7 |
| 6,528,758 B2 * | 3/2003 | Shaffer | D06Q 1/00 | 219/121.68 |
| 6,577,380 B1 * | 6/2003 | Sposili | B23K 26/064 | 355/67 |
| 6,621,041 B2 * | 9/2003 | Hayashi | G02B 5/1857 | 219/121.67 |
| 6,635,849 B1 * | 10/2003 | Okawa | B23K 26/064 | 219/121.73 |
| 6,861,614 B1 * | 3/2005 | Tanabe | H01L 21/02598 | 219/121.66 |
| 6,872,913 B1 * | 3/2005 | Jendick | B23K 26/0846 | 219/121.68 |
| 6,888,096 B1 * | 5/2005 | Hamada | B23K 26/0738 | 219/121.7 |
| 7,067,763 B2 * | 6/2006 | Schramm | H01L 21/67282 | 219/121.69 |
| 7,136,084 B2 * | 11/2006 | Miller | B23K 26/066 | 347/225 |
| 7,700,892 B2 * | 4/2010 | Jung | H01L 27/1285 | 219/121.62 |
| 7,812,283 B2 * | 10/2010 | Tanaka | B23K 26/066 | 219/121.73 |
| 8,030,593 B2 * | 10/2011 | Yoshikawa | B23K 26/0648 | 219/121.63 |
| 8,217,302 B2 * | 7/2012 | Alpay | B23K 26/046 | 219/121.72 |
| 8,878,095 B2 * | 11/2014 | Li | B23K 26/066 | 219/121.75 |
| 9,796,046 B2 * | 10/2017 | Rumsby | B23K 26/0626 | |
| 10,780,527 B2 * | 9/2020 | Richerzhagen | B23K 26/1476 | |
| 2002/0083557 A1 * | 7/2002 | Jung | H01L 21/02422 | 23/295 R |
| 2002/0162825 A1 * | 11/2002 | Lizotte | G02B 26/101 | 219/121.7 |
| 2003/0000930 A1 * | 1/2003 | Hamada | G03F 1/20 | 219/121.73 |
| 2003/0052100 A1 * | 3/2003 | Philipp | B23K 26/0838 | 219/121.69 |
| 2003/0192182 A1 * | 10/2003 | Hiramatsu | H05K 3/4652 | 29/852 |
| 2004/0027630 A1 * | 2/2004 | Lizotte | B23K 26/04 | 359/15 |
| 2004/0074881 A1 * | 4/2004 | Oishi | H01L 21/02425 | 219/121.63 |
| 2004/0217268 A1 * | 11/2004 | Tobiason | G01D 5/34723 | 250/231.13 |
| 2004/0222197 A1 * | 11/2004 | Hiramatsu | B23K 26/067 | 219/121.7 |
| 2004/0222365 A1 * | 11/2004 | Tobiason | G01D 5/268 | 250/231.13 |
| 2005/0247682 A1 * | 11/2005 | Kuroiwa | B23K 26/082 | 219/121.73 |
| 2005/0263498 A1 * | 12/2005 | Hiramatsu | B23K 26/082 | 219/121.7 |
| 2007/0139651 A1 * | 6/2007 | Courville | G02B 6/274 | 356/364 |
| 2007/0267571 A1 * | 11/2007 | Makinouchi | G01D 5/38 | 250/231.13 |
| 2008/0035616 A1 * | 2/2008 | Muller | B41J 2/471 | 219/121.72 |
| 2008/0193726 A1 * | 8/2008 | Shimada | G01C 19/5607 | 428/195.1 |
| 2008/0239300 A1 * | 10/2008 | Watanabe | G01J 1/0455 | 356/229 |
| 2008/0272096 A1 * | 11/2008 | Alpay | B23K 26/382 | 219/121.74 |
| 2009/0071947 A1 * | 3/2009 | Sekiguchi | G02B 19/0052 | 219/121.75 |
| 2009/0166812 A1 * | 7/2009 | Ruuttu | B23K 26/0821 | 257/629 |
| 2009/0173723 A1 * | 7/2009 | Nakagawa | B23K 26/40 | 219/121.71 |
| 2009/0289042 A1 * | 11/2009 | Ueda | G02B 26/127 | 219/121.72 |
| 2010/0315910 A1 * | 12/2010 | Lee | G01D 5/34746 | 369/13.11 |
| 2013/0119027 A1 * | 5/2013 | Yerazunis | B23K 26/08 | 219/121.72 |
| 2013/0186871 A1 * | 7/2013 | Suzuki | B23K 26/042 | 219/121.77 |
| 2013/0220983 A1 * | 8/2013 | Haschke | B23K 26/032 | 219/121.81 |
| 2014/0263221 A1 * | 9/2014 | Minehara | B23K 26/08 | 219/121.73 |
| 2016/0136756 A1 * | 5/2016 | Ogura | B23K 26/21 | 219/121.62 |
| 2017/0072506 A1 * | 3/2017 | Kusaka | B23K 26/0648 | |
| 2019/0009360 A1 * | 1/2019 | Aoki | B23K 26/30 | |
| 2019/0061064 A1 * | 2/2019 | Murakami | B23K 26/0821 | |
| 2020/0101563 A1 * | 4/2020 | Tao | B23K 26/082 | |
| 2020/0180069 A1 * | 6/2020 | Sangu | G02B 27/108 | |
| 2020/0214138 A1 * | 7/2020 | Arai | B23K 26/402 | |
| 2021/0053149 A1 * | 2/2021 | Takechi | B23K 26/0643 | |
| 2021/0080919 A1 * | 3/2021 | Nagayama | G05B 19/182 | |
| 2021/0323088 A1 * | 10/2021 | Yokoyama | B23K 26/032 | |

\* cited by examiner

ADJUSTMENT ASSISTANCE DEVICE AND LASER WELDING APPARATUS

This application is based on and claims the benefit of priority from Japanese Patent Application No. 2019-131893, filed on 17 Jul. 2019, the content of which is incorporated herein by reference.

BACKGROUND OF THE INVENTION

Field of the Invention

The present invention relates to an adjustment assistance device and a laser welding apparatus.

Related Art

A known conventional laser welding apparatus includes a laser head provided at an end of an arm of a multi-axis robot and including a galvanometer scanner. The galvanometer scanner includes two mirrors that are rotatable about respective rotary axes that are orthogonal to each other, and scans a laser beam output from a laser beam source by rotating the mirrors with servo motors (see, for example, Patent Document 1).

The laser welding apparatus has a tool coordinate system, which is an orthogonal coordinate system for specifying the focal position of the galvanometer scanner and the orientation of a tool. The origin of the tool coordinate system is set to the focal position determined by design values of the galvanometer scanner. The tool coordinate system may instead be set by teaching six points to the galvanometer scanner to which a dedicated rod is attached.

Patent Document 1: Japanese Unexamined Patent Application, Publication No. 2010-207878

SUMMARY OF THE INVENTION

When the tool coordinate system is set based on the focal position determined by the design values of the galvanometer scanner, the focal position of the tool coordinate system may be displaced from the designed focal position due to a mechanical cause. When the tool coordinate system is set by teaching six points, a movement of the arm is involved, and therefore a displacement may occur depending on the operator's skill level. Such a displacement is preferably compensated for. To carry out the compensation, the displacement of the actual focal position (actual light-receiving position) with respect to the designed focal position (reference light-receiving position) is preferably quantified.

(1) According to an aspect of the present disclosure, an adjustment assistance device is attached to a galvanometer scanner at a laser output side of the galvanometer scanner and used to adjust a tool coordinate system of the galvanometer scanner. The adjustment assistance device includes a light-receiving member having a light-receiving surface, which is at least one flat surface; and a connecting member that connects the light-receiving member to the galvanometer scanner, the connecting member enabling the light-receiving surface to face a laser output port of the galvanometer scanner with a predetermined distance therebetween. The light-receiving member includes a light-receiving mark portion on the light-receiving surface, the light-receiving mark portion being a mark used to quantify a relative positional difference between a reference light-receiving position for light output from the laser output port and an actual light-receiving position at which the light output from the laser output port is received.

(2) According to another aspect of the present disclosure, a laser welding apparatus includes the above-described adjustment assistance device; the galvanometer scanner positioned to overlap an axis of a lens disposed in the laser output port, the galvanometer scanner including an imaging unit that obtains an image of the light-receiving surface; and a control device that controls the galvanometer scanner. The control device includes a quantifying unit that quantifies the relative positional difference based on the reference-point mark portion, a mesh mark portion, and the actual light-receiving position, which are included in the image that is obtained, and an adjustment executing unit that adjusts the tool coordinate system based on the quantified relative positional difference.

The present disclosure provides an adjustment assistance device and a laser welding apparatus capable of quantifying a displacement of an actual light-receiving position with respect to a reference light-receiving position.

DETAILED DESCRIPTION OF THE INVENTION

An adjustment assistance device 100 and a laser welding apparatus 1 according to each embodiment of the present disclosure will be described with reference to FIGS. 1 to 5. An overview of the laser welding apparatus 1 will now be described.

The laser welding apparatus 1 includes a galvanometer scanner (tool) that is capable of emitting a welding laser beam and that is attached to an end of a robot arm (not shown). The laser welding apparatus 1 performs a process (welding) on a workpiece (not shown) by irradiating the workpiece with the laser beam emitted by the galvanometer scanner 10. The laser welding apparatus 1 is capable of irradiating the workpiece with the laser beam in any direction by operating (moving and rotating) the galvanometer scanner 10 with respect to the workpiece in an XYZ coordinate system (tool coordinate system). Before the workpiece is processed, the tool coordinate system is set as a coordinate system having an origin at, for example, a focal position on the workpiece.

Figure 1:
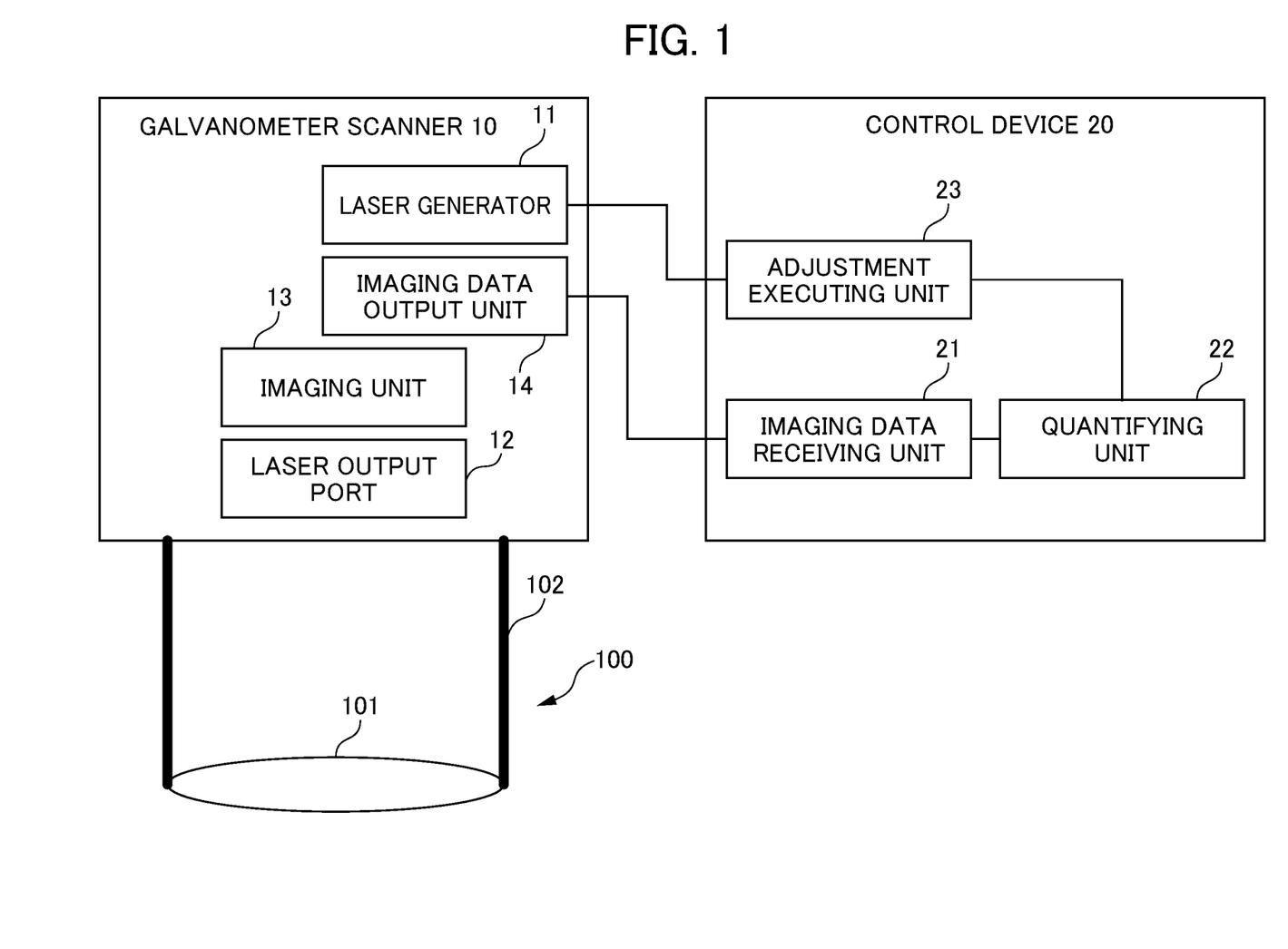
FIG. 1 is a schematic block diagram illustrating a laser welding apparatus according to a first embodiment.

An adjustment assistance device 100 and a laser welding apparatus 1 according to a first embodiment of the present disclosure will now be described with reference to FIGS. 1 to 5. As illustrated in FIG. 1, the laser welding apparatus 1 according to the present embodiment includes the adjustment assistance device 100, a galvanometer scanner 10, and a control device 20.

Figure 2:
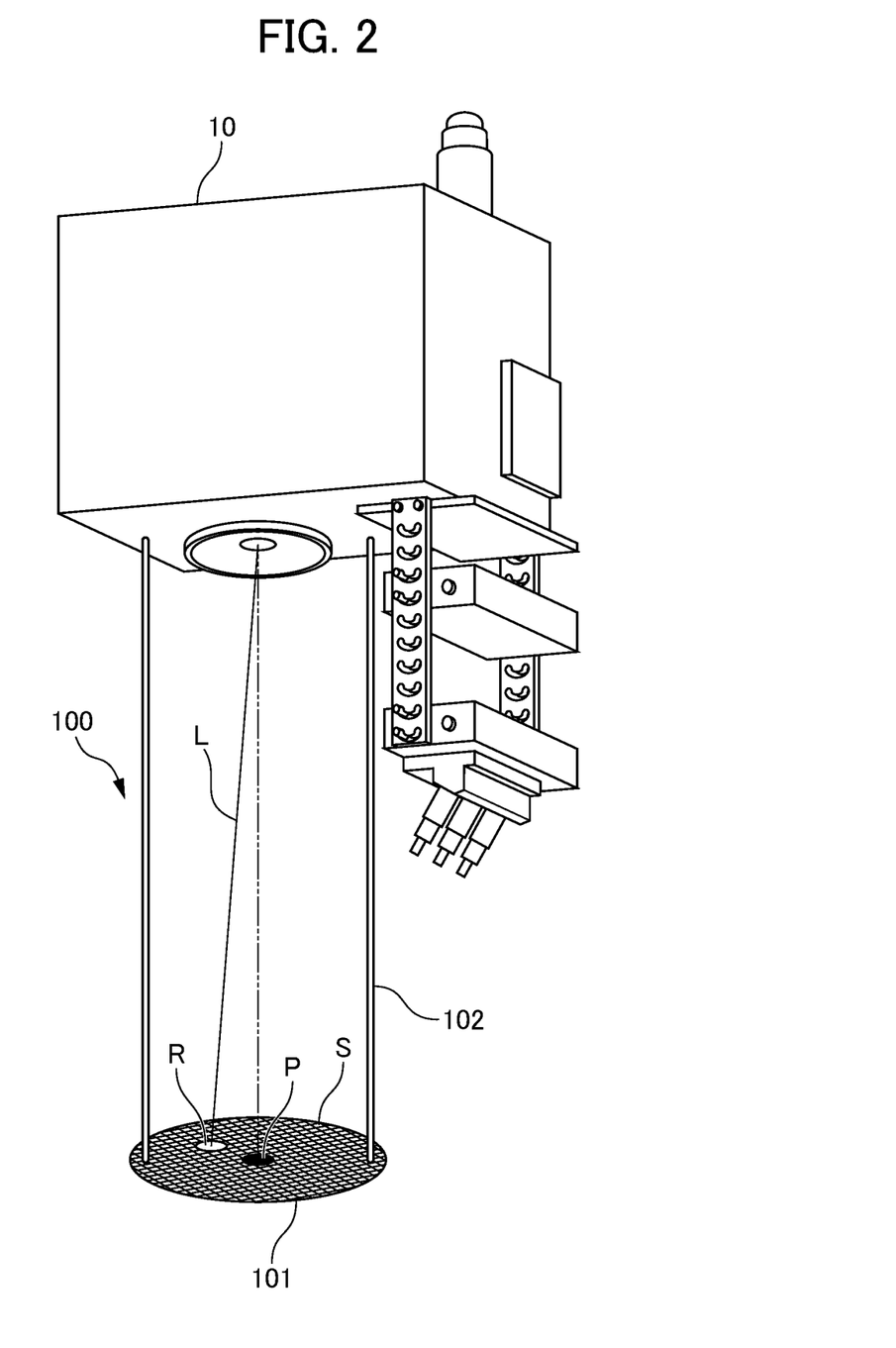
FIG. 2 is a schematic perspective view of an adjustment assistance device according to the first embodiment.

The adjustment assistance device 100 is a device that quantifies a displacement between the actual focal position (origin) of the set tool coordinate system and the designed focal position of the galvanometer scanner 10. The adjustment assistance device 100 is mounted on the galvanometer scanner 10 at a laser output side of the galvanometer scanner 10, and is used to adjust the tool coordinate system of the galvanometer scanner 10. As illustrated in FIG. 2, the adjustment assistance device 100 includes a light-receiving member 101 and connecting members 102.

Figure 3:
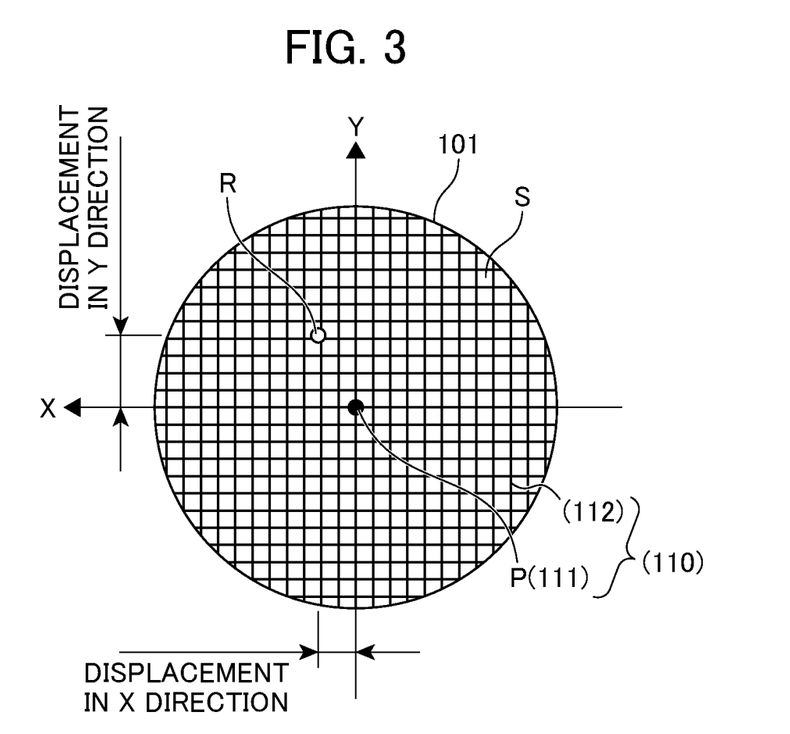
FIG. 3 is a plain view of a light-receiving surface of the adjustment assistance device according to the first embodiment.

The light-receiving member 101 is, for example, a member having at least one flat surface as a light-receiving surface. More specifically, the light-receiving member 101 is a member having a light-receiving surface S that receives light output from an output port of the galvanometer scanner 10. According to the present embodiment, the light-receiving member 101 is a disc-shaped light-receiving plate, and one surface of the disc-shaped light-receiving plate serves as the light-receiving surface S. As illustrated in FIG. 3, the light-receiving member 101 includes a light-receiving mark portion 110.

The light-receiving mark portion 110 is a mark disposed on the light-receiving surface S. The light-receiving mark portion 110 is an index used to quantify the relative positional difference between a reference light-receiving position P for light output from the laser output port 12 and an actual light-receiving position R at which the light output from the laser output port 12 is received. Here, the term "reference light-receiving position" means the focal position of a lens (not shown) disposed in the laser output port 12, that is, the designed focal position of the galvanometer scanner 10. The light-receiving mark portion 110 includes a reference-point mark portion 111 and a mesh mark portion 112.

The reference-point mark portion 111 is a mark that shows the reference light-receiving position P with a reference point on the light-receiving surface S. The reference-point mark portion 111 is, for example, a mark that shows the focal position of the lens disposed in the laser output port 12 on the light-receiving surface S. The reference-point mark portion 111 is positioned to overlap an axis of the lens disposed in the laser output port 12.

The mesh mark portion 112 includes a plurality of lines arranged at predetermined intervals in a mesh pattern on the light-receiving surface S. In other words, the mesh mark portion 112 includes mesh lines that form a grid-shaped mark on the light-receiving surface S. The mesh mark portion 112 is constituted by, for example, lines arranged at intervals of 0.5 mm in a mesh pattern.

The connecting members 102 are members that connect the light-receiving member 101 to the galvanometer scanner 10. The connecting members 102 function as, for example, spacers (space providing members) for spacing the light-receiving member 101 from the laser output port 12 by a predetermined distance. More specifically, the connecting members 102 function as spacers for enabling the light-receiving surface S of the light-receiving member 101 to face the laser output port 12 with a predetermined distance therebetween. In the present embodiment, the connecting members 102 are two rod-shaped members whose length is equal or substantially equal to the focal length of the lens included in the galvanometer scanner 10. A first end of each connecting member 102 is connected to a circumferential portion of the light-receiving surface S of the light-receiving member 101. A second end of each connecting member 102 is connected to the galvanometer scanner 10 at the laser output side of the galvanometer scanner 10.

The galvanometer scanner 10 is a device attached to an end of an arm (not shown) when in operation. The galvanometer scanner 10 includes a laser generator 11, the laser output port 12, an imaging unit 13, and an imaging data output unit 14.

The laser generator 11 is, for example, a device that generates a welding laser beam. The laser generator 11 includes galvanometer mirrors (not shown), and changes the direction of the generated laser beam by changing the amounts of rotation of the galvanometer mirrors. In addition, the laser generator 11 emits guide light L in a direction toward a point set as the origin of the tool coordinate system.

The laser output port 12 is configured such that the laser beam and the guide light L generated by the laser generator 11 can be emitted therefrom. The laser output port 12 is positioned to overlap the direction along which the laser beam is output from a laser generator 11. A lens that transmits the laser beam is disposed in the laser output port 12.

The imaging unit 13 is, for example, a camera. The imaging unit 13 is positioned to overlap the axis (to be on the axis) of the lens in the laser output port 12, and is configured to be capable of obtaining an image of the light-receiving surface S of the light-receiving member 101 through the laser output port 12. The imaging unit 13 is, for example, configured to be capable of obtaining an image of the light-receiving mark portion 110 on the light-receiving surface S and the light-receiving position R at which the guide light L is received.

The imaging data output unit 14 is, for example, a communication interface such as a modem. The imaging data output unit 14 is configured to be capable of outputting data regarding the image obtained by the imaging unit 13.

The control device 20 is, for example, a controller. The control device 20 sets, for example, the tool coordinate system and controls the operation of the galvanometer mirrors. The control device 20 includes an imaging data receiving unit 21, a quantifying unit 22, and an adjustment executing unit 23.

The imaging data receiving unit 21 is, for example, a communication interface. The imaging data receiving unit 21 receives the imaging data output by the imaging unit 13.

The quantifying unit 22 is realized by, for example, an operation of a CPU. The quantifying unit 22 quantifies the relative positional difference based on the actual light-receiving position R shown on the light-receiving mark portion 110. More specifically, the quantifying unit 22 quantifies the relative positional difference between the reference light-receiving position P and the actual light-receiving position R included in the imaging data by using the distance and direction on the mesh mark portion 112.

Figure 4:
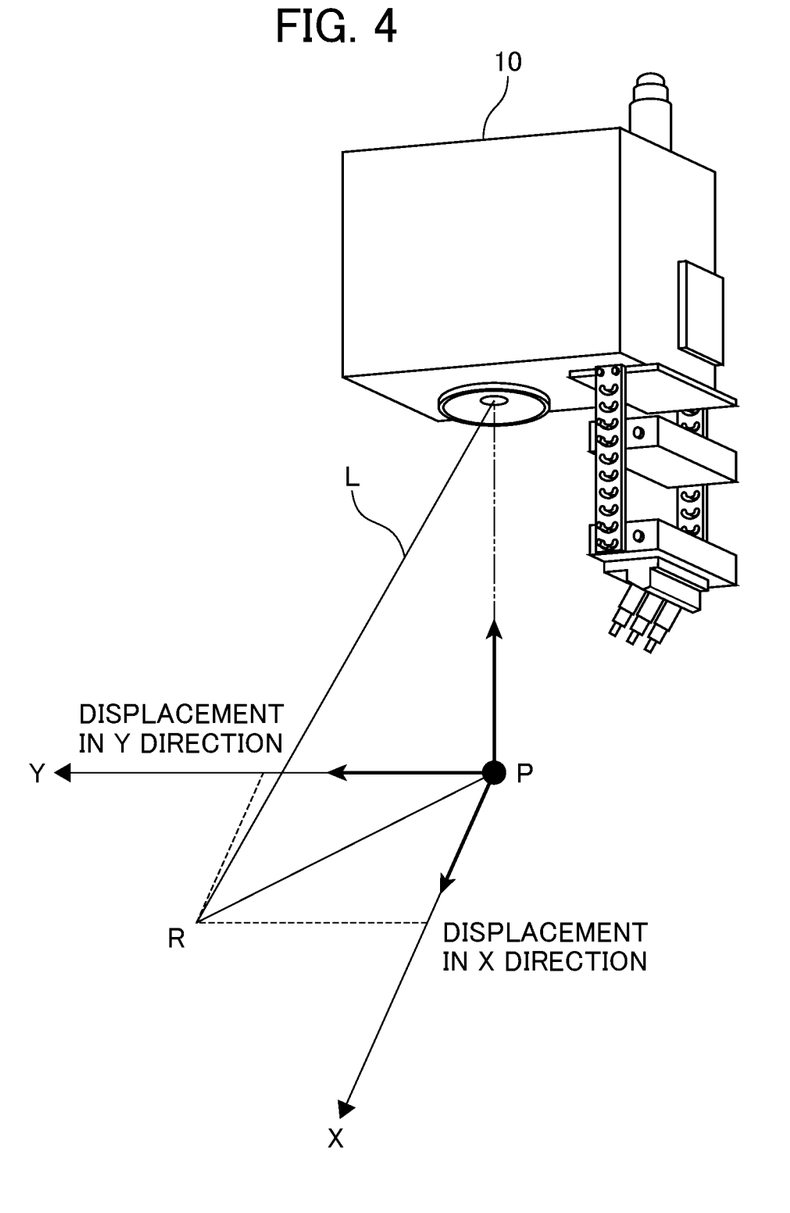
FIG. 4 is a schematic diagram illustrating the relationship between a set tool coordinate system for the laser welding apparatus according to the first embodiment and guide light.
Figure 5:
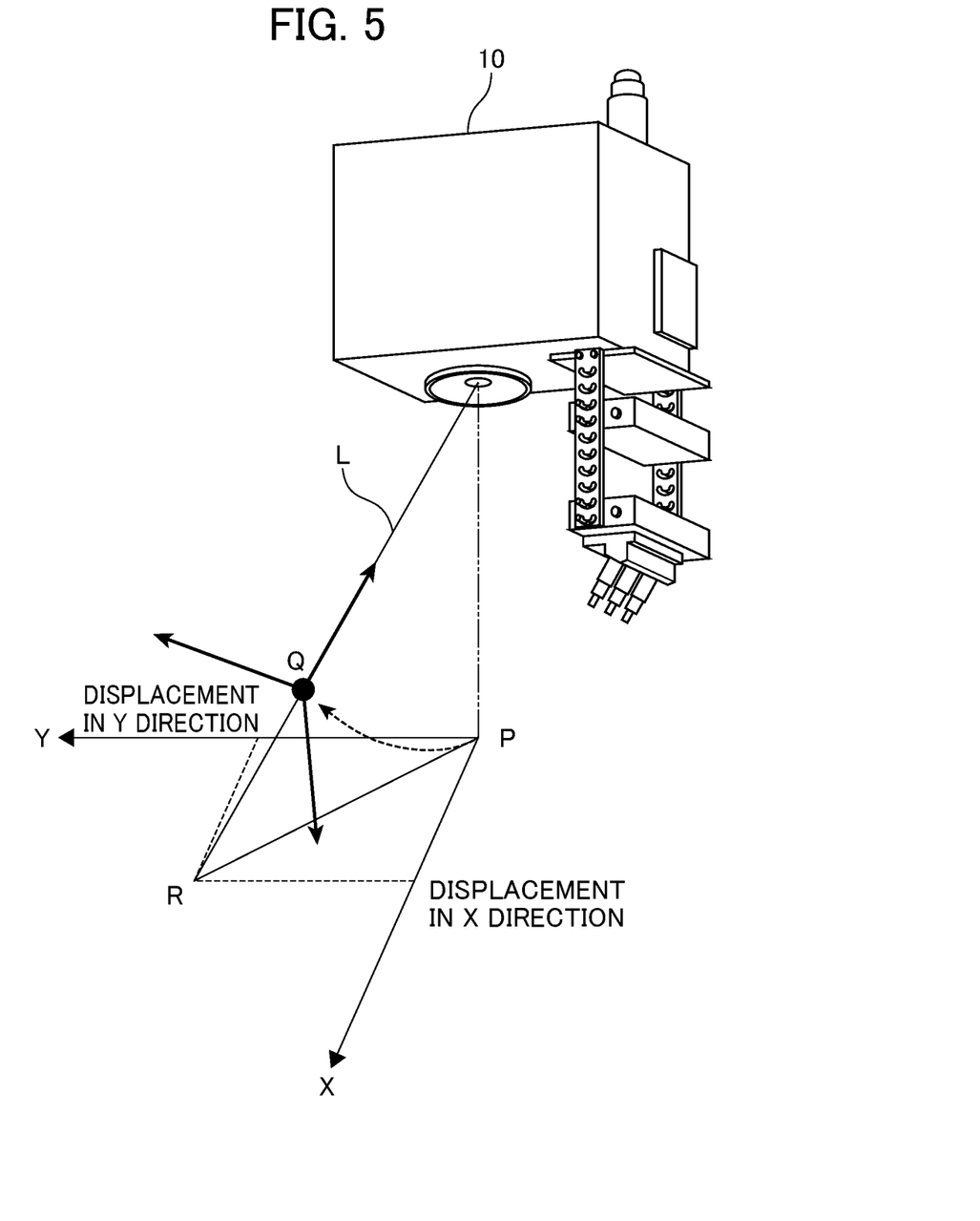
FIG. 5 is a schematic diagram illustrating an adjusted tool coordinate system for the laser welding apparatus according to the first embodiment.

The adjustment executing unit 23 is realized by, for example, an operation of the CPU. The adjustment executing unit 23 executes an adjustment of the preset tool coordinate system based on the quantified relative positional difference. For example, as illustrated in FIG. 4, the adjustment executing unit 23 executes an adjustment of the tool coordinate system whose origin is set to the reference light-receiving position P to move the origin P of the tool coordinate system to a position on an optical axis that passes through the actual light-receiving position R. More specifically, the adjustment executing unit 23 executes the adjustment to move the origin P of the tool coordinate system to a position Q on the optical axis that passes through the actual light-receiving position R and at a distance that is equal or substantially equal to the actual focal length.

The adjustment assistance device 100 and the laser welding apparatus 1 described above are used in the following manner. First, the adjustment assistance device 100 is attached to the galvanometer scanner 10 at the laser output side of the galvanometer scanner 10. More specifically, first, the light-receiving surface S of the light-receiving member 101 is positioned to face the laser output port 12. Next, the adjustment assistance device 100 is moved toward the laser output port 12. Then, the second ends of the connecting members 102 are attached to the galvanometer scanner 10 at the side where the laser output port 12 is disposed. At this time, the light-receiving mark portion 110 is positioned on the axis of the lens in the laser output port 12.

Next, the guide light L is emitted from the laser output port 12 of the galvanometer scanner 10 toward the origin of the tool coordinate system. The light-receiving surface S receives the guide light L output from the laser output port 12.

Next, the imaging unit 13 obtains an image of the light-receiving surface S receiving the guide light L. The imaging unit 13 obtains an image including, for example, the reference-point mark portion 111, the mesh mark portion 112, and the light-receiving position R at which the guide light L is received. Next, the imaging data output unit 14 outputs the obtained image as imaging data.

The imaging data receiving unit 21 receives the output imaging data. The quantifying unit 22 quantifies the relative positional difference between the reference light-receiving position and the light-receiving position R at which the guide light L is received based on the reference-point mark portion 111, the mesh mark portion 112, and the light-receiving position R at which the guide light L is received, which are included in the imaging data. The quantifying unit 22 quantifies, for example, the distance and direction from the reference light-receiving position to the light-receiving position R.

Next, the adjustment executing unit 23 adjusts the tool coordinate system based on the quantified distance and direction. Thus, the adjustment executing unit 23 moves, for example, the origin P of the tool coordinate system illustrated in FIG. 4 to the position Q on the guide light L illustrated in FIG. 5. At this time, the adjustment executing unit 23 moves the origin P such that the focal length from the lens becomes the same length on the guide light L. Then, the adjustment executing unit 23 sets the position Q to which the origin P has been moved as the new origin of the tool coordinate system. Thus, the adjustment of the tool coordinate system is completed.

The adjustment assistance device 100 and the laser welding apparatus 1 described above have the following advantages.

(1) The adjustment assistance device 100 is attached to the galvanometer scanner 10 at the laser output side of the galvanometer scanner 10, and used to adjust the tool coordinate system of the galvanometer scanner 10. The adjustment assistance device 100 includes the light-receiving member 101 having the light-receiving surface S, which is at least one flat surface, and the connecting members 102 that connect the light-receiving member to the galvanometer scanner. The connecting members 102 enable the light-receiving surface S to face the laser output port 12 of the galvanometer scanner 10 with a predetermined distance therebetween. The light-receiving member includes the light-receiving mark portion 110 on the light-receiving surface S. The light-receiving mark portion 110 is a mark used to quantify the relative positional difference between the reference light-receiving position P for light output from the laser output port 12 and the actual light-receiving position R at which the light output from the laser output port 12 is received. Thus, the relative positional difference between the reference light-receiving position P and the actual light-receiving position R can be quantified. Therefore, the actual light-receiving position R can be easily adjusted to an ideal light-receiving position.

(2) The light-receiving mark portion 110 includes the reference-point mark portion 111 on the light-receiving surface S. The reference-point mark portion 111 shows the reference light-receiving position P with a reference point. Accordingly, the relative positional difference can be easily visually recognized.

(3) The light-receiving mark portion 110 also includes the mesh mark portion 112 on the light-receiving surface S. The mesh mark portion 112 includes a plurality of lines arranged at predetermined intervals in a mesh pattern. Accordingly, the relative positional difference can be easily visually recognized. In addition, the direction in which the actual light-receiving position R is located from the reference light-receiving position P can also be recognized.

(4) The laser welding apparatus 1 includes the above-described adjustment assistance device 100; the galvanometer scanner 10 positioned to overlap the axis of the laser output port 12, the galvanometer scanner 10 including the imaging unit 13 that obtains an image of the light-receiving surface S; and the control device 20 that controls the galvanometer scanner 10. The control device 20 includes the quantifying unit 22 and the adjustment executing unit 23. The quantifying unit 22 quantifies the relative positional difference based on the reference-point mark portion 111, a mesh mark portion 112, and the actual light-receiving position R, which are included in the image that is obtained. The adjustment executing unit 23 adjusts the tool coordinate system based on the quantified relative positional difference. Thus, the relative positional difference can be quantified and the origin of the tool coordinate system can be moved. Therefore, high-accuracy processing can be realized by compensating for the displacement of the light-receiving position at which the laser beam is received.

(5) The adjustment executing unit 23 moves the set origin of the tool coordinate system in accordance with the actual light-receiving position. Thus, the origin of the tool coordinate system can be adjusted in practice.

Second Embodiment

An adjustment assistance device 100 and a laser welding apparatus 1 according to a second embodiment of the present disclosure will now be described. In the description of the second embodiment, components that are the same as those in the above-described embodiment will be denoted by the same reference numerals, and description thereof will be omitted or simplified. The laser welding apparatus 1 according to the second embodiment differs from that of the first embodiment in that the adjustment executing unit 23 moves the actual light-receiving position to the set origin of the tool coordinate system by changing the reference positions (reference angles) of the galvanometer mirrors included in the galvanometer scanner 10. More specifically, the adjustment executing unit 23 carries out the adjustment by finely adjusting the reference position of an X-axis galvanometer mirror and the reference position of a Y-axis galvanometer mirror to angles at which the guide light L can be emitted toward the reference light-receiving position.

The adjustment assistance device 100 and the laser welding apparatus 1 according the second embodiment described above have the following advantage.

(6) The adjustment executing unit 23 moves the actual light-receiving position to the set origin of the tool coordinate system by changing the reference positions of the galvanometer mirrors included in the galvanometer scanner 10. Accordingly, the origin of the tool coordinate system can be adjusted in practice.

Although the adjustment assistance device and the laser welding apparatus 1 according to the present disclosure are described with reference to the preferred embodiments, the present disclosure is not limited to the above-described embodiments, and modifications may be made as appropriate. For example, although the light-receiving mark portion 110 includes the mesh mark portion 112 in the above-described embodiments, the light-receiving mark portion 110 is not limited to this. The light-receiving mark portion 110 may include, instead of the mesh mark portion 112, a circular mark portion (not shown) including a plurality of circles arranged concentrically around the reference light-receiving position P. Alternatively, the light-receiving mark portion 110 may include, instead of the mesh mark portion 112, the circular mark portion and a plurality of radial mark portions (not shown) that extend radially from the reference light-receiving position P. The mesh mark portion 112, the circular mark portion, and the radial mark portions may be marks that enable positions on the light-receiving surface S to be distinguished based on, for example, the colors, thicknesses, or line types thereof.

In the above-described embodiments, the control device 20 may further include a position confirmation unit (not shown) that confirms the positions of the reference-point mark portion 111 and the axis of the lens in the laser output port. The position confirmation unit may confirm, for example, whether or not the reference-point mark portion 111 is on the axis of the lens based on the position of the reference-point mark portion 111 included in the image obtained by the imaging unit 13 and the position of the axis of the lens. The position confirmation unit may output a signal to the outside when the reference-point mark portion 111 is not on the axis of the lens.

In the above-described embodiments, the reference light-receiving position P is the focal position. However, the reference light-receiving position P is not limited to this. For example, the reference light-receiving position P may be any position within the depth of field of the lens.

EXPLANATION OF REFERENCE NUMERALS 1 laser welding apparatus
10 galvanometer scanner
12 laser output port
13 imaging unit
20 control device
22 quantifying unit
23 adjustment executing unit
100 adjustment assistance device
101 light-receiving member
102 connecting member
110 light-receiving mark portion
111 reference-point mark portion
112 mesh mark portion
P reference light-receiving position
R actual light-receiving position
S light-receiving surface

What is claimed is:

1. An adjustment assistance device attached to a galvanometer scanner at a laser output side of the galvanometer scanner and used to adjust a tool coordinate system of the galvanometer scanner, the adjustment assistance device comprising:
    a light-receiving member having a light-receiving surface, which is at least one flat surface; and
    a connecting member that connects the light-receiving member to the galvanometer scanner and that positions the light-receiving member at a focal position and focal length of the galvanometer scanner, the connecting member enabling the light-receiving surface to face a laser output port of the galvanometer scanner with a predetermined distance therebetween,
    wherein the light-receiving member includes a light-receiving mark portion on the light-receiving surface, the light-receiving mark portion being a mark used to quantify a relative positional difference between a reference light-receiving position for light output from the laser output port and an actual light-receiving position at which the light output from the laser output port is received.

2. The adjustment assistance device according to claim 1, wherein the light-receiving mark portion includes a reference-point mark portion on the light-receiving surface, the reference-point mark portion showing the reference light-receiving position with a reference point.

3. The adjustment assistance device according to claim 2, wherein the light-receiving mark portion includes a mesh mark portion on the light-receiving surface, the mesh mark portion including a plurality of lines arranged at predetermined intervals in a mesh pattern.

4. A laser welding apparatus comprising:
    the adjustment assistance device according to claim 2;
    the galvanometer scanner positioned to overlap an axis of a lens disposed in the laser output port, the galvanometer scanner including an imaging unit that obtains an image of the light-receiving surface; and
    a control device that controls the galvanometer scanner, wherein the control device includes
    a quantifying unit that quantifies the relative positional difference based on the reference-point mark portion, a mesh mark portion, and the actual light-receiving position, which are included in the image that is obtained, and
    an adjustment executing unit that adjusts the tool coordinate system based on the quantified relative positional difference.

5. The laser welding apparatus according to claim 4, wherein the adjustment executing unit moves a set origin of the tool coordinate system in accordance with the actual light-receiving position.

6. The laser welding apparatus according to claim 4, wherein the adjustment executing unit moves the actual light-receiving position to a set origin of the tool coordinate system by changing a reference position of a galvanometer mirror included in the galvanometer scanner.

* * * * *